Patented Feb. 8, 1927.

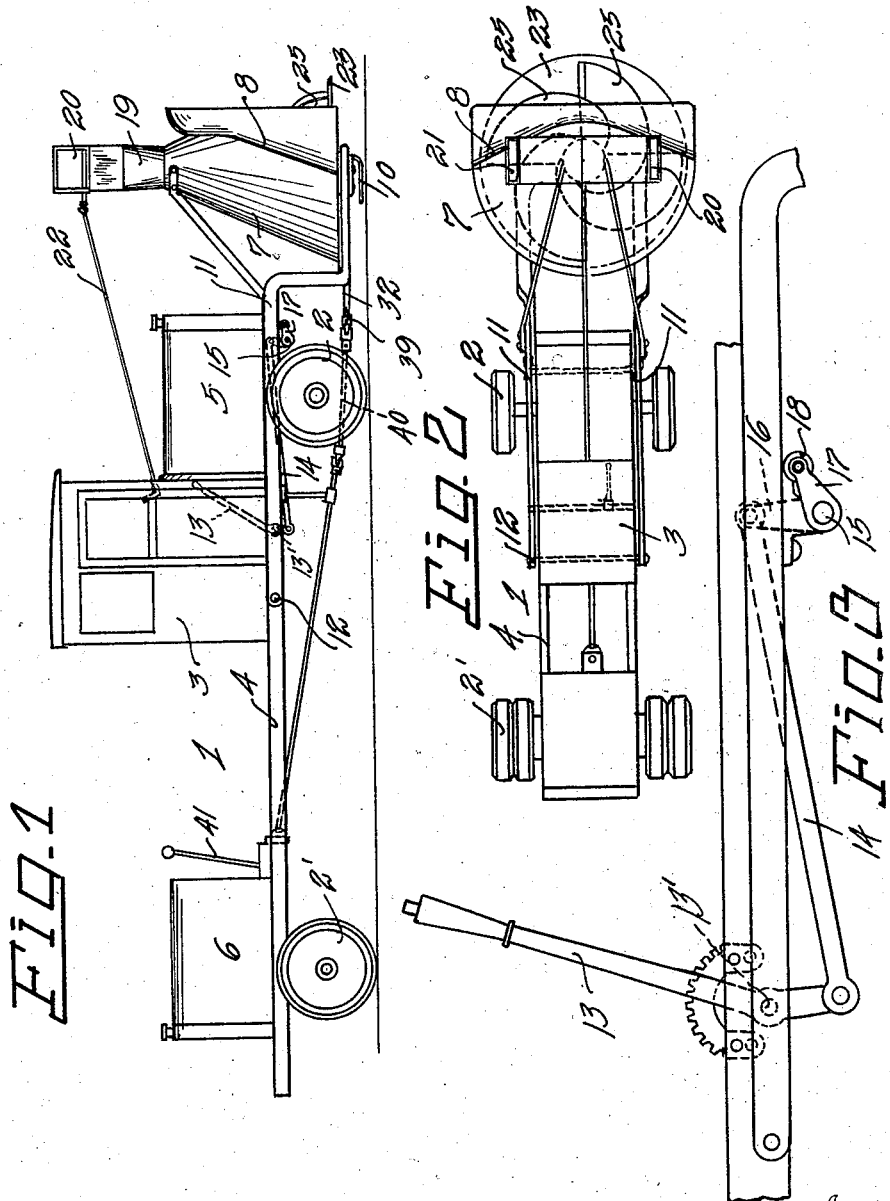

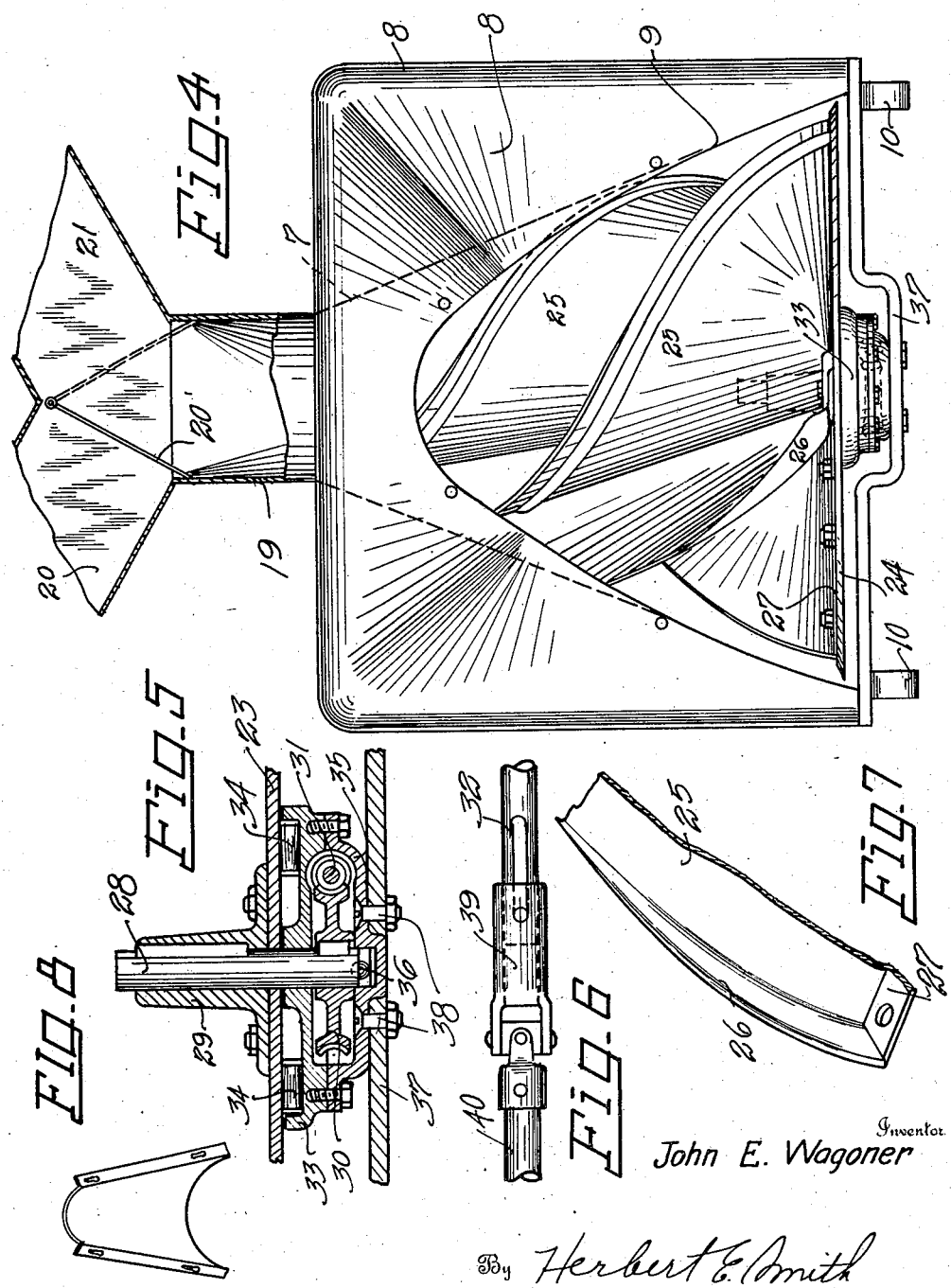

1,616,835

UNITED STATES PATENT OFFICE.

JOHN E. WAGONER, OF TROUT CREEK, MONTANA, ASSIGNOR OF ONE-THIRD TO EDWARD HOPE MALONEY AND ONE-THIRD TO WILFRED C. LANE, BOTH OF SPOKANE, WASHINGTON.

SNOW REMOVER.

Application filed November 14, 1925. Serial No. 69,022.

My present invention relates to improvements in snow removers or excavators designed especially for clearing highways, streets, roads, &c. in order that traffic may be continued without undue interruption during the winter months. The implement of my invention is particularly adapted for clearing and keeping open mountain roads and highways where traffic for automobile busses and other vehicles is usually difficult and in some instances suspended during the winter season because of snow covered roads.

The implement of my invention utilizes an automotive vehicle or truck and a self contained power plant in addition to the propulsion motor ordinarily used on the truck, with a snow removing device or excavator located at the front end of the truck and designed to convey the snow to the roadside. The snow remover or excavator is of the rotary type having a vertical axis and employing a tapered screw cutter or excavator for gathering and conveying the snow to a stack from which it is discharged through either or both of a pair of laterally extending flues.

The invention consists in certain novel combinations and arrangements of parts involving the rotary excavator and conveyer and its accessory parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a view in side elevation of an implement embodying my invention.

Figure 2 is a top plan view of the implement.

Figure 3 is an enlarged detail view in side elevation of the means for elevating the excavator.

Figure 4 is an enlarged front elevation of the excavator.

Figure 5 is an enlarged detail sectional view of the driving gear and bearing for the excavator.

Figure 6 is a detail showing a flexible joint in the drive shaft for the excavator.

Figure 7 is a detail view in perspective of a portion of one of the screw conveyer flights showing particularly a cutting edge thereon, and Fig. 8 is a perspective view of the movable hood which encloses the front of the snow plow.

In carrying out my invention I utilize an automotive vehicle of the truck type indicated as a whole by the numeral 1 which is provided with the forward steering wheels 2 and rear driving wheels 2'. A cab 3 is provided for the driver of the vehicle and located on the frame 4 at the rear of the usual propelling motor located within the hood 5. At the rear of the vehicle a motor for operating the excavator is located within the hood 6, the weight of the motor being located over the traction or drive wheels to enhance their tractive force.

The snow remover is located at the front of the vehicle and is carried in a frustoconical housing 7 which is fashioned with a rectangular front plate or shield 8 whose faces 8' are inclined inwardly to an arched opening 9 of the shield. The two side faces and the upper face of the shield are designed to guide and direct the snow as it is agitated by the rotary excavator toward the opening 9 and prevent lateral displacement of the snow during the operation of the excavator.

The excavator is supported from the road surface by means of a pair of spaced, longitudinally extending shoes or runners 10, 10 designed to slide over the ground as the vehicle is propelled forwardly and prevent contact with the road surface of the excavator.

Means are provided for vertically adjusting the excavator and supporting it from the vehicle, and for this purpose I employ a pair of angular side arms 11, 11 pivoted at their rear ends, as 12, to the frame of the vehicle and projecting forwardly of the front of the vehicle as seen in Figure 1. The side arms are movable through the action of a manually operated lever 13 pivoted at 13' and provided with a link 14 which rocks the shaft 15 through a crank arm 16. The shaft extends transversely of the vehicle and is journaled in suitable bearings on the frame. By means of a pair of lever arms 17 and rollers 18 at the free ends of these lever arms the side arms 11 are directly supported from beneath.

It will be apparent in Figure 3 that by swinging the lever 13 to the right the shaft 15 will be rocked to swing the lever arms 17 up and to the left, and the rolling contact of the rollers 18 with the side arms elevates the arms. By swinging the lever in the opposite direction the excavator and side arms are lowered by gravity.

Above the housing 7 a centrally located stack 19 is provided and this stack terminates in a pair of laterally disposed flues 20 and 21. At the junction of the stack and flues a gate 20' is pivoted and by means of a rod 22 extending back to the cab this gate may be manually operated from full to dotted line position in Figure 4 to direct the snow from the excavator to one or the other of the laterally extending flues.

The combined excavator and conveyer is fashioned in the form of a tapered screw having a circular base plate 23 located at the lower end of the tapered or conical housing 7 and substantially closing its lower end. The base plate is disposed in horizontal position and is fashioned with an annular, beveled cutting edge 24 for contact with the snow in front of it or in front of the excavator. Above the base plate are affixed a suitable number of spirally arranged tapering screw flights 25 fashioned of suitable metal plates and each formed with a cutting edge or flange 26. At their lower ends the flights are provided with attaching flanges 27 and bolts are employed for attaching the flights to the rotary base plate. The rigid base plate and flights of the excavator are positioned just at the rear of the front shield and the front portions of the base plate and its flights project a suitable distance through the arched opening 9 to insure contact of the excavator with the snow on the road. The rigid base plate and flights are thus rotated or revolved on a vertical axis, cutting into the snow and gathering the cut snow and conveying it to the stack from which stack the snow is forced by the screw action of the excavator through one or the other of the lateral discharging flues.

As best seen in Figure 5 the rotary excavator is provided with a vertically disposed shaft 28 which is rigidly fixed to a boss 29 and the latter is rigidly bolted to the base plate 23. A worm wheel 30 is keyed on the lower end of the shaft and this wheel receives power from a worm screw 31 on the drive shaft section 32.

A fixed, flanged bearing head 33 is located beneath the base plate 23 and roller bearings 34 are arranged in an annular race between the upper face of the head and the lower face of the base plate for supporting the rotary parts of the excavator.

A gear housing 35 is bolted beneath the bearing head, and a bearing ball 36 is interposed between the lower end of the shaft and the wall of a recess in the housing as an additional antifriction support for the shaft and rotary parts of the excavator.

The housing and bearing head are rigidly affixed to a cross brace 37 by bolts 38 and this cross brace which is rigidly affixed to the side arms 11, 11, with these arms, forms a supporting frame for the excavator and its housing.

At the rear of the excavator the longitudinally disposed shaft section 32 of the driving mechanism is provided with a flexible coupling 39 to the drive shaft 40 from the motor in the housing or hood 6, and a manually operated control lever 41 of usual type is employed to control the speed of the rotary excavator.

As the vehicle is impelled or propelled forwardly on the roadway the shield 8 is designed to force its way into the snow and its inclined faces 8' direct the snow to the rotary excavator. Should the snow become packed in front of the excavator, the cutting edges 26 of the spiral flights of the excavator bite into the snow breaking down the pile into small portions in order that they may be conveyed by the screw excavator to the stack and lateral flue. Under condition where snow is not very deep a shield, Fig. 8, may be used by attaching to the shield and serves the purpose of enclosing more of the rotary excavation to direct the snow into the stack.

Having thus fully described my invention what I claim as new and desire to secure by Letters Patent is—

1. In a snow remover a combined excavator and conveyer comprising a rotary base plate having a circular cutting edge, a series of spirally arranged tapered screw flights fixed to said base plate, and angular cutting edges on said flights, a shaft rigid with said base plate, a supporting frame and a bearing head rigid therewith, anti-friction bearings between said plate and head, and means for revolving said shaft.

2. The combination with a pivoted supporting frame comprising a pair of side arms and a cross brace, of a gear housing and bearing head rigid with said brace, a rotary excavator and conveyer comprising a circular base plate and anti-friction bearings between said plate and head, a shaft rigid with the plate and journaled in said head and means for revolving said shaft, spirally arranged, tapered screw flights secured to said plate, a conical housing enclosing said excavator and conveyer and provided with a front opening and shield, a stack for the housing, oppositely disposed discharge flues connected with the stack and means for directing snow through either flue.

In testimony whereof I affix my signature.

JOHN E. WAGONER.